United States Patent
Tan et al.

(10) Patent No.: US 10,674,069 B2
(45) Date of Patent: Jun. 2, 2020

(54) METHOD AND APPARATUS FOR BLURRING PREVIEW PICTURE AND STORAGE MEDIUM

(71) Applicant: GUANGDONG OPPO MOBILE TELECOMMUNICATIONS CORP., LTD., Dongguan, Guangdong (CN)

(72) Inventors: Guohui Tan, Dongguan (CN); Chengpeng Du, Dongguan (CN)

(73) Assignee: GUANGDONG OPPO MOBILE TELECOMMUNICATIONS CORP. LTD., Dongguan (CN)

( * ) Notice: Subject to any disclaimer, the term of this patent is extended or adjusted under 35 U.S.C. 154(b) by 13 days.

(21) Appl. No.: 16/150,411

(22) Filed: Oct. 3, 2018

(65) Prior Publication Data
US 2019/0166302 A1 May 30, 2019

(30) Foreign Application Priority Data
Nov. 30, 2017 (CN) .......................... 2017 1 1242145

(51) Int. Cl.
H04N 5/232 (2006.01)
H04N 5/222 (2006.01)
(Continued)

(52) U.S. Cl.
CPC ..... *H04N 5/23212* (2013.01); *G06K 9/00771* (2013.01); *G06K 9/2036* (2013.01);
(Continued)

(58) Field of Classification Search
CPC .... H04N 13/122; H04N 5/2226; H04N 5/232; H04N 5/23212; H04N 5/23216;
(Continued)

(56) References Cited

U.S. PATENT DOCUMENTS

2008/0084584 A1* 4/2008 Kauhanen .......... H04N 5/23212
358/3.27
2009/0303342 A1 12/2009 Corcoran
(Continued)

FOREIGN PATENT DOCUMENTS

CN 101609505 A 12/2009
CN 103152521 * 6/2013 ............... G06T 7/00
(Continued)

OTHER PUBLICATIONS

First Office Action of the Chinese application No. 201711242145.2, dated Jun. 3, 2019.
(Continued)

*Primary Examiner* — Twyler L Haskins
*Assistant Examiner* — Akshay Trehan

(57) ABSTRACT

Disclosed is a method and apparatus for blurring a preview picture and storage medium. Portrait recognition is performed on a first preview picture to determine information of a target portrait in the first preview picture. The information of the target portrait includes an area and position of the target portrait. A target region to be protected is determined according to the information of the target portrait. In switching preview pictures, blurring is performed on a region, except the target region, in a second preview picture.

14 Claims, 5 Drawing Sheets

(51) Int. Cl.
  *H04N 5/262* (2006.01)
  *H04N 9/04* (2006.01)
  *H04N 13/122* (2018.01)
  *G06K 9/20* (2006.01)
  *G06K 9/00* (2006.01)
  *G06T 7/13* (2017.01)
  *G06T 5/00* (2006.01)

(52) U.S. Cl.
  CPC .............. *G06T 5/002* (2013.01); *G06T 5/008* (2013.01); *G06T 7/13* (2017.01); *H04N 5/2226* (2013.01); *H04N 5/232* (2013.01); *H04N 5/23216* (2013.01); *H04N 5/23219* (2013.01); *H04N 5/23229* (2013.01); *H04N 5/23267* (2013.01); *H04N 5/232935* (2018.08); *H04N 5/2621* (2013.01); *H04N 9/045* (2013.01); *H04N 13/122* (2018.05); *G06T 2207/10028* (2013.01); *G06T 2207/20081* (2013.01); *G06T 2207/30201* (2013.01)

(58) Field of Classification Search
  CPC ........... H04N 5/23219; H04N 5/23229; H04N 5/23267; H04N 5/232935; H04N 5/2621; H04N 9/045; G06T 5/002; G06T 5/008; G06T 7/13; G06T 2207/20081
  See application file for complete search history.

(56) References Cited

U.S. PATENT DOCUMENTS

| | | | |
|---|---|---|---|
| 2011/0026780 A1 | 2/2011 | Corcoran | |
| 2012/0162470 A1* | 6/2012 | Kim | G06F 16/58 348/231.2 |
| 2012/0188398 A1* | 7/2012 | Kusaka | H04N 5/232 348/222.1 |
| 2013/0223698 A1 | 8/2013 | Corcoran et al. | |
| 2015/0092078 A1* | 4/2015 | Corcoran | G06K 9/00228 348/222.1 |
| 2016/0330369 A1 | 11/2016 | Corcoran et al. | |

FOREIGN PATENT DOCUMENTS

| | | | | |
|---|---|---|---|---|
| CN | 103152521 A | | 6/2013 | |
| CN | 103679175 A | * | 3/2014 | .............. G06K 9/46 |
| CN | 103679175 A | | 3/2014 | |
| CN | 104463777 | * | 3/2015 | .............. G06T 3/00 |
| CN | 104463777 A | | 3/2015 | |
| CN | 104751407 A | * | 7/2015 | .............. G06T 3/00 |
| CN | 104751407 A | | 7/2015 | |
| CN | 105389801 A | | 3/2016 | |
| CN | 105516586 A | * | 4/2016 | ......... H04N 5/23216 |
| CN | 105516586 A | | 4/2016 | |
| CN | 105847674 A | | 8/2016 | |
| CN | 105959503 A | | 9/2016 | |
| CN | 105979165 A | | 9/2016 | |
| CN | 106937054 A | | 7/2017 | |
| CN | 106971165 A | | 7/2017 | |
| CN | 107197138 A | | 9/2017 | |
| CN | 107395965 A | | 11/2017 | |
| CN | 107948517 A | | 4/2018 | |

OTHER PUBLICATIONS

Supplementary European Search Report in the European application No. 18202285.5, dated Jul. 9, 2019.
Partial European Search Report dated Apr. 1, 2019; Appln. No. 18202285.5.
The International Search Report dated Jan. 18, 2019; PCT/CN2018/111736.
The Written Opinion of the International Searching Authority dated Jan. 18, 2019; PCT/CN2018/111736.
International Search Report in international application No. PCT/CN2018/111736, dated Jan. 18, 2019.
Written Opinion of the International Search Authority in international application No. PCT/CN2018/11173, dated Jan. 18, 2019.
Partial Supplementary European Search Report in European application No. 18202285.5, dated Apr. 1, 2019.

* cited by examiner

METHOD AND APPARATUS FOR BLURRING PREVIEW PICTURE AND STORAGE MEDIUM

CROSS-REFERENCE TO RELATED APPLICATIONS

The present application is based upon and claims priority to Chinese Patent Application No. 201711242145.2, filed on Nov. 30, 2017, the contents of which are hereby incorporated by reference in its entirety.

BACKGROUND

For highlighting a shot subject and focusing on the shot subject in a shot image, real-time blurring may usually be performed on a background region in the shot image.

At present, when real-time blurring is performed on a background region of a shot image, depth information of field of a frame picture is usually calculated in a process of displaying the frame picture acquired by an image sensor. Then blurring is performed on a part of the background region according to the calculated depth information of field. However, when blurring is performed on the shot picture in such a manner, relatively long time is required for calculation of the depth information of field of the shot picture. Moreover, when a shot subject shakes, there is no enough time to update the depth information of field of the shot picture so as to make it likely to blur part of the subject, which further brings influence on an overall blurring effect and worsens user experience.

SUMMARY

The present application relates to image processing, and particularly to a method and apparatus for blurring a preview picture and a storage medium.

In an aspect, there is provided a method for blurring a preview picture. Portrait recognition is performed on a first preview picture to determine information of a first portrait in the first preview picture. The information of the first portrait information includes an area of the first portrait. A target region to be protected is determined according to the information of the first portrait. In switching preview pictures, blurring is performed on a region other than the target region in a second preview picture.

In another aspect, there is provided an apparatus for blurring a preview picture, including a processor and a memory. The memory is configured to store instructions, when executed by the processor, causing the processor to implement the operations of: performing portrait recognition on a first preview picture to determine information of a first portrait in the first preview picture, the information of the first portrait comprising an area of the first portrait; determining a target region to be protected according to the information of the first portrait; and in switching preview pictures, blurring a region other than the target region in a second preview picture.

In still another aspect, there is provided a non-transitory computer-readable storage medium having stored herein executable instructions by a processor of a terminal device. The executable instructions, when being executed, are configured to implement the method for blurring a preview picture.

Additional aspects and advantages of the present application will be partially presented in the following descriptions and partially become apparent from the following descriptions or get understood by implementing the present application.

BRIEF DESCRIPTION OF DRAWINGS

The abovementioned and/or additional aspects and advantages of the present application will become apparent and easy to understand from the descriptions made to the embodiments below in combination with the drawings.

DETAILED DESCRIPTION

Figure 1:
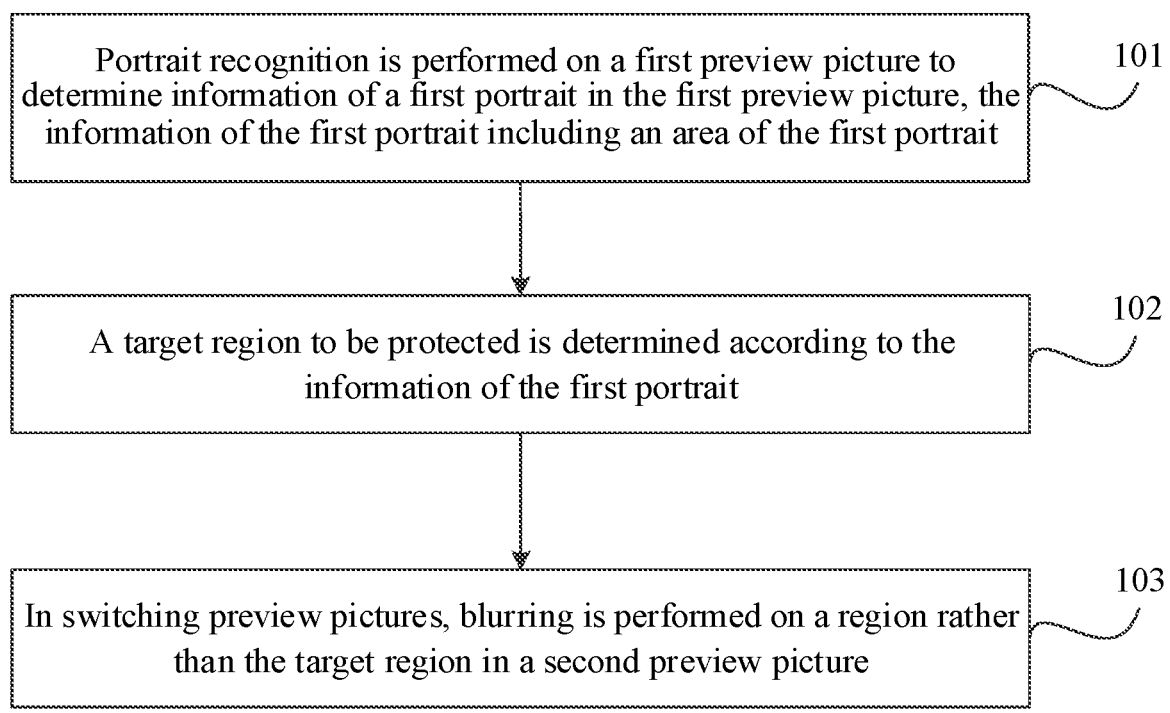
FIG. 1 is a flowchart of a method for blurring a preview picture according to an embodiment of the present application.

The embodiments of the present application will be described below in detail. Examples of the embodiments are illustrated in the drawings and the same or similar reference signs always represent the same or similar components or components with the same or similar functions. The embodiments described below with reference to the drawings are exemplary and intended to explain the present application and should not be understood as limits to the present application.

In a related art, when blurring is performed on a background region of a preview picture, it is not only required relatively long time to calculate depth information of field of a shot picture, but also there is no enough time to update the depth information of field of the shot picture when an subject in the shot picture shakes, so as to make it likely to blur part of the subject to further bring influence on an overall blurring effect of the shot picture and worsen a user experience. For solving the problems, a method for blurring a preview picture is provided.

According to the method provided in the present application, portrait recognition is performed on a first preview picture to determine information of first portrait in the first preview picture, the information of the first portrait including an area of the first portrait. A target region to be protected is determined according to the determined information of the first portrait. During preview picture switching, blurring is performed on region other than the target region in a second preview picture. Therefore, when blurring is performed on the preview picture, a blurring speed of the preview picture is increased, and time is saved. Moreover, a shot subject is prevented from being blurred in case of shaking, so that a blurring effect of the preview picture is improved, and a satisfaction degree of a user is improved.

A method of acquiring a blurred image based on the embodiments of the present application will be described below with reference to the drawings.

FIG. 1 is a flowchart of a method for blurring a preview picture according to an embodiment of the present application.

As shown in FIG. 1, the method for blurring a preview picture of the present application may include the following operations.

In 101, portrait recognition is performed on a first preview picture to determine information of a first portrait in the first preview picture, the information of the first portrait including an area of the first portrait.

Specifically, the method provided in the embodiment of the present application may be executed by an apparatus for blurring the preview picture provided in the present application. The apparatus is configured in terminal equipment to implement blurring control over the preview picture.

In the embodiment, the terminal equipment may be any hardware equipment with a shooting function, for example, a smart phone, a camera and a Personal Computer (PC). There are no specific limits made thereto in the present application.

Optionally, the terminal equipment in the embodiment may also be hardware equipment with double cameras. The double cameras refer to two rear cameras.

It is to be noted that, in the embodiment, the two rear cameras may be arranged in one of a horizontal direction or a vertical direction.

Herein, the horizontal direction refers to a direction parallel to a short side of the terminal equipment, and the vertical direction refers to a direction parallel to a long side of the terminal equipment.

It is noted that the portrait herein refers to at least one of a face or a body of the shot subject.

Figure 2:
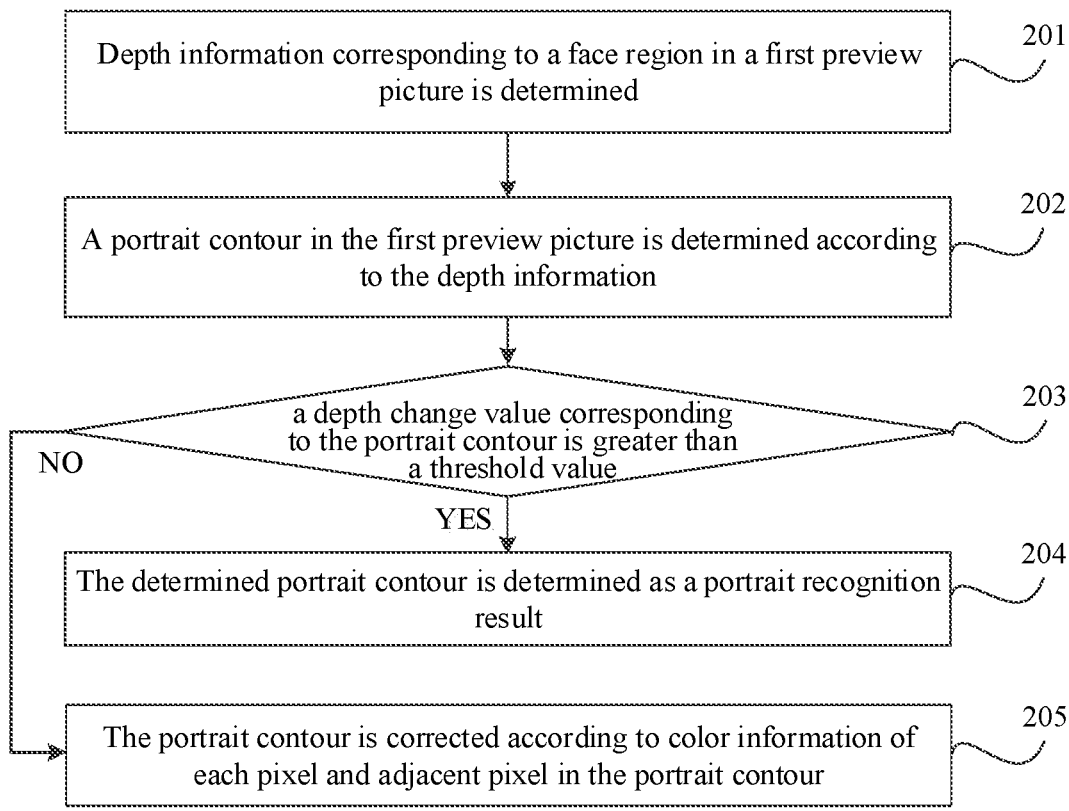
FIG. 2 is a flowchart of performing portrait recognition on a first preview picture according to an embodiment of the present application.

When operation 101 is specifically executed, portrait recognition may be performed on the first preview picture through operations shown in FIG. 2 in the embodiment. Face recognition is taken as an example in FIG. 2.

Specifically, the operation that portrait recognition is performed on the preview picture may include the following operations.

In 201, depth information corresponding to a face region in the first preview picture is determined.

During specific implementation, a face in the first preview picture may be recognized by a face recognition technology of any form. For example, eyes included in the first preview picture may be captured at first, then the face region is determined according to the captured face, and the depth information corresponding to the face region is acquired in different manners according to the number of cameras of the terminal equipment.

For example, if the terminal equipment has a single camera, the first preview picture may be scanned through an ultrasonic radar to obtain the depth information corresponding to the face region.

If the terminal equipment has double cameras, depth information of an subject, i.e., a distance between the subject and a plane where the double cameras are located, may be calculated according to a triangulation ranging principle and according to a difference between the double cameras with regard to the subject.

In 202, a portrait contour in the first preview picture is determined according to the depth information.

Specifically, during a practical application, a picture shot by the terminal equipment usually includes a foreground region and a background region. There is a relatively obvious depth change between the foreground region and the background region. Therefore, in the embodiment, after the depth information corresponding to the face region is acquired, the portrait contour in the first preview picture may be determined according to the depth information.

In 203, it is judged whether a depth change value corresponding to the portrait contour is greater than a threshold value or not. If YES, operation 204 is executed, otherwise operation 205 is executed.

The threshold value may be adaptively set according to a shooting condition of the portrait in the first preview picture and will not be specifically limited in the present application.

Specifically, after the portrait contour in the first preview picture is acquired, the depth change value of the face contour may further be compared with the threshold value to determine whether the face contour is accurately acquired or not. If the depth change value of the face contour is greater than the threshold value, it is indicated that the portrait contour determined in operation 202 meets a requirement. If the depth change is smaller than the threshold value, it is indicated that the portrait contour determined in operation 202 does not meet the requirement. The portrait contour is required to be corrected to make a finally determined portrait contour more accurate.

In 204, the determined portrait contour is determined as a portrait recognition result.

In 205, the portrait contour is corrected according to color information of each pixel and adjacent pixel in the portrait contour.

Specifically, the color information of the pixel and adjacent pixel thereof in the portrait contour is acquired. Then, it is determined whether a color change between adjacent pixels divided by the portrait contour is obvious or not by comparison. If NO, it is indicated that the determined portrait contour is inaccurate. Therefore, the portrait contour may be extended outwards or shrunk inwards. When a color difference between the adjacent pixels divided by the portrait contour is obvious, the portrait contour is determined as a final portrait recognition result.

Furthermore, the information of the first portrait in the first preview picture may be determined according to the determined portrait contour.

Herein, the first portrait may be located in any region in the first preview picture, which will not be specifically limited in the present application.

During specific implementation, in the embodiment, the number of portraits in the first preview picture may be one or multiple, for example, two, three and five, which will not be specifically limited in the present application.

When portrait recognition is performed on the first preview picture through the apparatus for blurring the preview picture, there may be one or more such determined first portraits.

In a possible implementation of the embodiment, when it is recognized that portraits in the first preview picture includes a portrait not required to be protected, a user may manually select the first portrait. That is, the user may sketch a trajectory in a display interface of the terminal to select the first portrait.

Then, the apparatus for blurring the preview picture determines area information of the first portrait according to the trajectory sketched by the user.

Herein, the trajectory sketched by the user on the display interface of the terminal may be a closed curve or an unclosed curve, which will not be specifically limited in the present application.

In an alternative embodiment, the first portrait may also be determined according to an image pre-shot by the terminal. That is, a picture is shot for the first character and storage by the terminal equipment. When an image with a background blurred effect is shot, the terminal equipment automatically finds a portrait similar to the first portrait from portraits recognized in a preview interface according to the pre-shot picture for the first portrait and determines the found portrait as the first portrait.

In 102, a target region to be protected is determined according to the information of the first portrait.

Specifically, when a background blurred image is practically shot, a shot subject may shake or a hand of a photographer may tremble when pressing a shooting button, so that there may exist the condition that the shot subject in a shot picture is blurred. For avoiding occurrence of such a condition, in the present application, a region including the first portrait in the preview picture may be determined according to the determined first portrait information, and the region including the first portrait is determined as the target region to be protected.

During specific implementation, in the embodiment, the target region to be protected may be determined in the following manners. Descriptions will be made below with examples.

A First Implementation Manner

An area of the first portrait is enlarged by a preset factor, and an area of the target region is determined.

Herein the preset enlargement factor of the area of the portrait in the embodiment may be determined by the terminal as a default and may also be adaptively set by the user according to a practical requirement, which will not be limited in the present application.

Specifically, in the present application, the area of the first portrait in the first preview picture is enlarged to keep the first portrait in a subsequently acquired frame picture located in an enlarged region, so that the portrait in the shot picture may be prevented from being blurred when background blurring is subsequently performed on the preview picture, thereby ensuring integrity of the portrait.

A Second Implementation Manner

The area of the target region is determined according to a matching degree of the information of the first portrait and a preset portrait template in a library of portrait templates.

Herein the library of portrait templates in the embodiment may be obtained by training according to a large number of portrait image samples, which will not be limited in the present application.

The library of portrait templates is configured to define correspondences between different attributes and portrait templates as well as maximum areas.

During specific implementation, in the embodiment, the recognized first portrait may be matched with the library of portrait templates to determine an attribute of the first portrait, and then the area of the target region is determined according to the attribute of the first portrait.

Herein, attribute information of the first portrait may be, but not limited to, an age or a sex, which will not be specifically limited in the present application.

For example, if the recognized first portrait is matched with the library of portrait templates to determine that the attribute of the first portrait is a child, an attribute and target region area mapping table may be searched for area information, corresponding to the child, of the target region.

It can be understood, in the present application, that the recognized portrait is matched with the library of portrait templates to determine the target region to be protected, so that time for blurring preview picture may be saved, and the user experience is further improved.

In 103, during preview picture switching, blurring is performed on a region other than the target region in a second preview picture.

Specifically, when the first preview picture is switched into the second preview picture, the apparatus for blurring the preview picture may perform blurring on the region other than the target region to be protected in the second preview picture according to the determined target region to be protected, thereby preventing the portrait in the preview picture from being blurred and improving the blurring effect of the preview picture.

It is to be noted that the user does not execute a blurring operation on each frame of preview image in a practical shooting process. If the apparatus for blurring the preview picture in the embodiment performs blurring on each frame of preview image in the abovementioned manner, it is likely to bring an excessively high processing load to the terminal equipment.

Therefore, for reducing the processing load of the terminal equipment, before blurring is performed on the region other than the target region in the preview picture in the present application, the following operations may further be executed.

A First Operation

An instruction for protecting a portrait edge is acquired.

Specifically, when blurring is required to be performed on a certain preview picture in the apparatus for blurring the preview picture, the user may provide multiple manners to input the instruction for protecting the portrait edge through the apparatus for blurring the preview picture.

Herein, the instruction for protecting the portrait edge may be inputted in a manual press manner, in a voice input manner, in a manual sliding manner or the like, which will not be limited in the present application.

A Second Operation

It is determined that a shaking amplitude of the shooting terminal is higher than a first threshold value.

Herein, the first threshold value may be adaptively set according to a practical shooting condition of the shooting terminal, which will not be specifically limited in the present application.

Specifically, in the practical shooting process, the shooting terminal may usually shake because of an external factor. Such shaking may cause a relative displacement difference between the shot subject in the shot picture and the terminal. Therefore, for ensuring that a clear picture in which a shot subject is not blurred may be shot when the shooting terminal shakes and the shaking amplitude is higher than the first threshold value, in the present application, the blurring operation may be executed on the region other than the target region to be protected in the second preview picture according to the determined target region to be protected to obtain an image in which the first portrait is highlighted and a background part is blurred.

According to the method for blurring the preview picture of the embodiment of the present application, portrait recognition is performed on the first preview picture to determine the first portrait in the first preview picture, then the target region to be protected is determined according to the determined first portrait information, and during preview picture switching, blurring is performed on the region other than the target region in the second preview picture. Therefore, when blurring is performed on the preview picture, the time for blurring the preview picture is saved. Moreover, the shot subject is prevented from being mistakenly blurred in case of shaking, so that the blurring effect of the preview picture is improved, and the satisfaction degree of the user is improved.

From the above analysis, portrait recognition is performed on the first preview picture to determine the information of the first portrait, then the target region to be protected is determined, and during preview picture switching, blurring is performed on the region other than the target region in the second preview picture. During specific implementation, in the present application, determination of the target region to be protected according to the information of the first portrait may be implemented in the following manners. The first one is to match the information of the first portrait and the library of portrait templates to determine the target region to be protected and the second one is to enlarge the area of the first portrait by the preset factor to determine the target region to be protected. If the first one is adopted to determine the target region to be protected in the embodiment, it is necessary to establish the library of portrait templates at first and then the target region to be protected is determined according to matching of the established library of portrait templates and the information of the first portrait. The establishment of a library of portrait templates in the embodiment will be described below in combination with FIG. 3 in detail.

Figure 3:
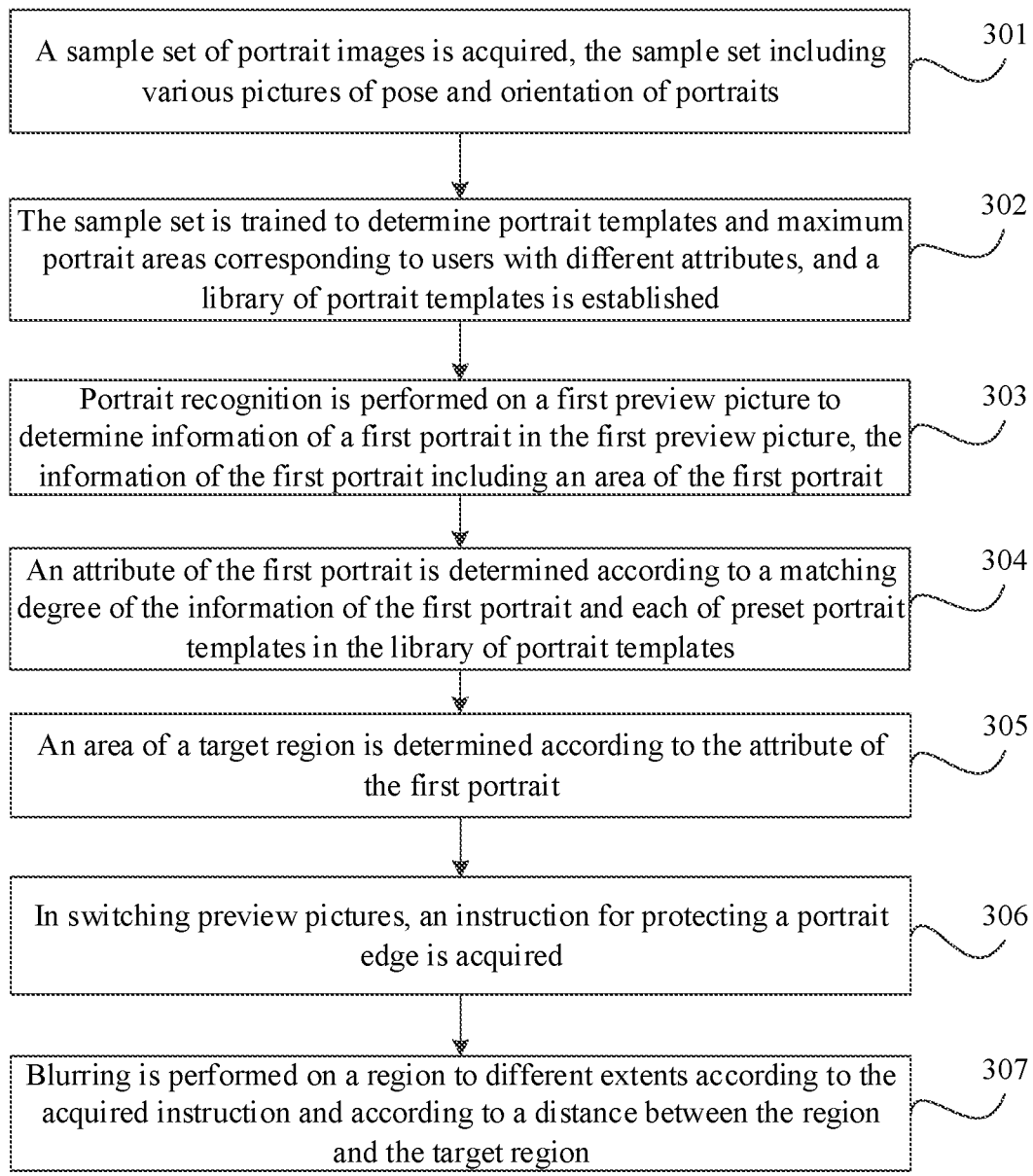
FIG. 3 is a flowchart of a method for blurring a preview picture according to another embodiment of the present application.

FIG. 3 is a flowchart of another method for blurring a preview picture according to the present application.

As shown in FIG. 3, the method for blurring the preview picture of the present application may include the following operations.

In 301, a sample set of portrait images is acquired, the sample set including various pictures of pose and orientation of portraits.

Herein, the various pictures of pose and orientation of portraits may be understood as different expressions of portraits, portrait poses or the like.

During specific implementation, the sample set of portrait images in the embodiment may be preconfigured when a terminal is delivered, or may also be acquired from a server side. There are no limits made thereto in the embodiment.

It is to be noted that, for ensuring persuasiveness of a subsequently established library of portrait templates, the sample set of portrait images acquired in the embodiment may include tells of thousands of, more than a hundred thousand and even millions of images, which will not be specifically limited in the present application.

In 302, the sample set of portrait images is trained to determine portrait templates and maximum portrait areas corresponding to users with different attributes, and a library of portrait templates is established.

Specifically, in the present application, after the sample set of portrait images is acquired, acquired portrait image samples may be analyzed to determine attribute information of each of portrait images in the sample set of portrait images. Then training is performed according to the attribute information of the sample set of portrait images to obtain portrait templates and maximum portrait areas corresponding to portrait images with different attributes. Then, the library of portrait templates is established according to correspondences between the portrait image samples and the portrait templates as well as the maximum portrait areas.

In 303, portrait recognition is performed on a first preview picture to determine first portrait information in the first preview picture, wherein the information of the first portrait includes an area of a first portrait.

In 304, an attribute of the first portrait is determined according to a matching degree of the information of the first portrait and each of preset portrait templates in the library of portrait templates.

Specifically, after the information of the first portrait in the first preview picture is determined, the determined first portrait information may be matched with each of portrait templates in the library of portrait templates, and the attribute information corresponding to the portrait template of which the matching degree is highest is determined as the attribute of the first portrait.

During specific implementation, the library of portrait templates may be acquired at first. The library of portrait templates includes correspondences between portrait attributes and portrait templates as well as maximum portrait areas. Then, the first portrait is matched with each of portrait templates of the acquired library of portrait templates to determine the portrait template with highest matching degree with the first portrait. The portrait attribute corresponding to the portrait template is determined as the attribute of the first portrait.

Furthermore, for improving accuracy of the library of portrait templates, in the embodiment of the present application, the library of portrait templates may also be periodically updated according to an image practically shot by the terminal.

For example, terminals used by different users may usually shoot different subjects and portrait features of different target subjects are different. For example, some shooting subjects move their heads gently when being shot and some shooting subjects move their heads violently when being shot. Alternatively, some shooting subjects are used to leaning their heads leftwards when being shot and some shooting subjects are used to leaning their heads rightwards when being shot.

Therefore, the terminal equipment may update the library of portrait templates according to port images acquired within a preset time during a practical application. Therefore, a target region determined by each terminal using the updated library of portrait templates is more accurate and reliable.

For example, if a portrait in portrait images acquired by terminal equipment A within a preset time is used to leaning leftwards, a maximum portrait area in the initial library of portrait templates is equal to a portrait area+a+b, where a represents an area, extended to the left side, of the portrait and b represents an area, extended to the right side, of the portrait. The maximum portrait area determined by the terminal equipment A after updating the library of portrait templates according to the acquired portrait image may be the portrait area+a+b+c, where c is an area determined according to a habit of the portrait in the acquired portrait image and enlarged along the left side of the portrait.

Herein, the preset time may be set according to a practical condition, for example, a week and a month. There are no limits made thereto in the present application.

In the embodiment, the initial library of portrait templates is a template library including portrait templates and maximum portrait areas corresponding to users with different attributes.

That is, in the embodiment, the initial library of portrait templates is irregularly updated. As such, when the attribute of the portrait is subsequently determined for the updated portrait template, recognition accuracy may further be improved, a recognition failure rate may be reduced, and a user experience is further improved.

In 305, an area of a target region is determined according to the attribute of the first portrait.

Specifically, since the correspondences between the portrait attributes and the portrait templates as well as the maximum portrait areas are stored in the library of portrait templates, in the present application, after the attribute of the first portrait is determined, the correspondences between the portrait attributes and the portrait templates as well as the maximum portrait areas may be queried to determine the area of the target region of the first portrait according to the attribute of the portrait.

In 306, during preview picture switching, an instruction for protecting a portrait edge is acquired.

Specifically, for reducing a preview picture blurring burden of the terminal equipment, in the embodiment, before blurring is performed on the preview picture with a blurring requirement, the instruction for protecting the portrait edge input by the user in multiple input manners provided through the apparatus for blurring the preview picture may be received at first.

Herein, the instruction for protecting the portrait edge may be input in a manual pressing manner, in a voice input manner, in a manual sliding manner or the like, which will not be limited in the present application.

In 307, blurring is performed on a region to different extents according to the acquired instruction for protecting the portrait edge and according to a distance between the region and the target region.

Specifically, after the instruction for protecting the portrait edge input by the user is acquired, the apparatus for blurring the preview picture may blur background on the preview picture according to the instruction for protecting the portrait edge.

Furthermore, in the present application, for highlighting a subject in the preview picture subjected to blurring and making a transition with a background part smoother and more natural, when blurring is performed on the other region of the preview picture, blurring may be performed on the preview picture from low to high blurring degrees.

Herein, in the present application, blurring is performed on a background region of the preview picture from low to high blurring degrees, so that the transition between the protected region and the blurred region is smoother, and an image presented on the shot preview picture is more natural.

According to the method for acquiring the blurred image of the embodiment of the present application, different sample sets of portrait images are acquired and trained to establish the library of portrait templates at first. The library of portrait templates includes the correspondences between the portrait attributes and the portrait templates as well as the maximum portrait areas. After portrait recognition is further performed on the first preview picture to determine the information of the first portrait in the first preview picture, the information of the first portrait may further be matched with each of portrait templates in the library of portrait templates to obtain the attribute of the first portrait, then the area of the target region is determined according to the attribute of the first portrait. During preview picture switching, blurring is performed on the region other than the target region, in the preview picture to different extents according to the determined target region and the instruction for protecting the portrait edge. Therefore, when blurring is performed on the preview picture, a blurring speed of the preview picture is increased, and time is saved. Moreover, a shot subject is prevented from being blurred in case of shaking, so that a blurring effect of the preview picture is improved, and a satisfaction degree of a user is improved.

In order to implement the abovementioned embodiments, the present application further provides an apparatus for blurring a preview picture.

Figure 4:
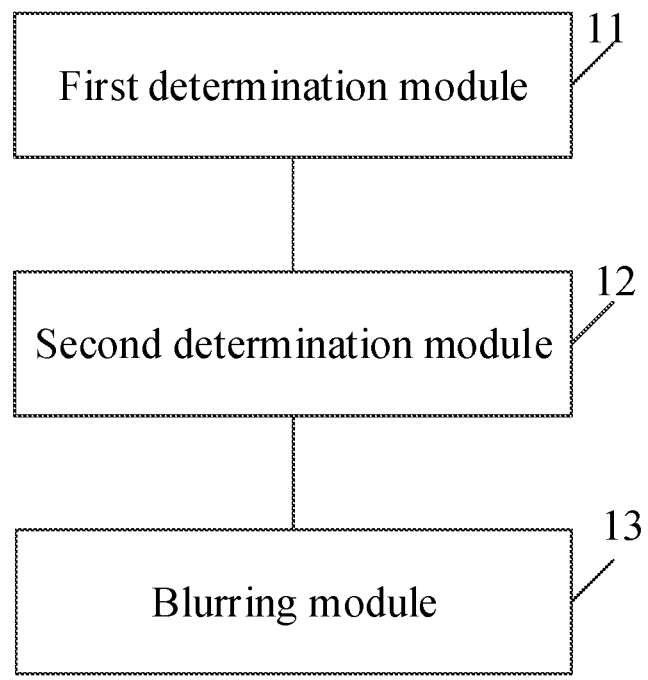
FIG. 4 is a structure diagram of an apparatus for blurring a preview picture according to an embodiment of the present application.

FIG. 4 is a structure diagram of an apparatus for blurring a preview picture according to an embodiment of the disclosure.

As shown in FIG. 4, the apparatus for blurring a preview picture of the present application includes a first determination module 11, a second determination module 12 and a blurring module 13.

The first determination module 11 is configured to perform portrait recognition on a first preview picture to determine first portrait information in the first preview picture. The information of the first portrait includes an area of a first portrait.

The second determination module 12 is configured to determine a target region to be protected according to the information of the first portrait.

The blurring module 13 is configured to, during preview picture switching, perform blurring on region other than the target region in a second preview picture.

It is to be noted that explanations and descriptions about the embodiment of the method for blurring the preview picture are also applied to the apparatus for blurring the preview picture of the embodiment. Implementation principle thereof is similar and will not be elaborated herein.

According to the apparatus for blurring the preview picture of the embodiment, portrait recognition is performed on the first preview picture to determine the first portrait in the first preview picture, then the target region to be protected is determined according to the determined information of the first portrait, and during preview picture switching, blurring is performed on the region other than the target region in the second preview picture. Therefore, when blurring is performed on the preview picture, the time for blurring the preview picture is saved. Moreover, the shot subject is prevented from being mistakenly blurred in case of shaking, so that the blurring effect of the preview picture is improved, and the satisfaction degree of the user is improved.

In order to implement the abovementioned embodiments, the present application further provides terminal equipment.

Figure 5:
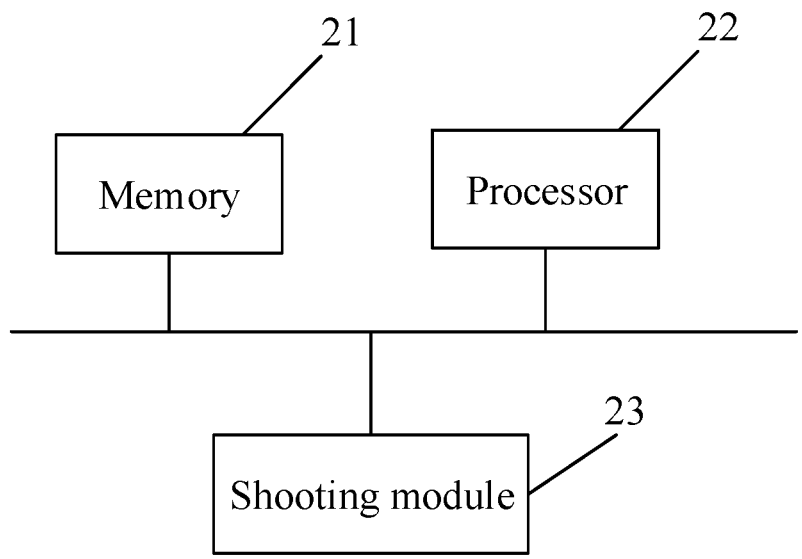
FIG. 5 is a structure diagram of terminal equipment according to an embodiment of the present application.

FIG. 5 is a structure diagram of terminal equipment according to an embodiment of the disclosure.

Referring to FIG. 5, the terminal equipment of the present application includes a memory 21, a processor 22 and a shooting module 23.

The shooting module 23 is configured to acquire an image in a scenario.

The memory 21 is configured to store executable program codes.

The processor 22 is configured to read the executable program codes stored in the memory 21 to run a program corresponding to the executable program codes to implement the method for blurring the preview picture according to the first aspect of the embodiments. The method for blurring the preview picture includes that portrait recognition is performed on a first preview picture to determine information of a first portrait in the first preview picture, the information of the first portrait including an area of the first portrait; a target region to be protected is determined according to the information of the first portrait; and during preview picture switching, blurring is performed on a region other than the target region in a second preview picture.

In the embodiment, the terminal equipment may be any hardware equipment with a shooting function, for example, a smart phone, a camera and a PC. There are no specific limits made thereto in the present application.

In an aspect, the terminal equipment in the embodiment may also be hardware equipment with double cameras. The double cameras refer to two rear cameras. In another aspect, a front camera is further included.

It is to be noted that explanations and descriptions about the embodiment of the method for blurring the preview picture are also applied to the terminal equipment of the embodiment and its implementation principle is similar and will not be elaborated herein.

Furthermore, the terminal equipment of the present application may further include an image processing circuit 24.

The memory 21 is configured to store instructions executable by the processor 22.

The processor 22 is configured to call the program codes in the memory 21 to implement the method for blurring the preview picture according to the first aspect of the embodiments according to the blurred picture output by the image processing circuit 24.

Specifically, the image processing circuit 24 may be implemented by a hardware and/or software component, and may include various processing units defining an Image Signal Processing (ISP) pipeline.

Figure 6:
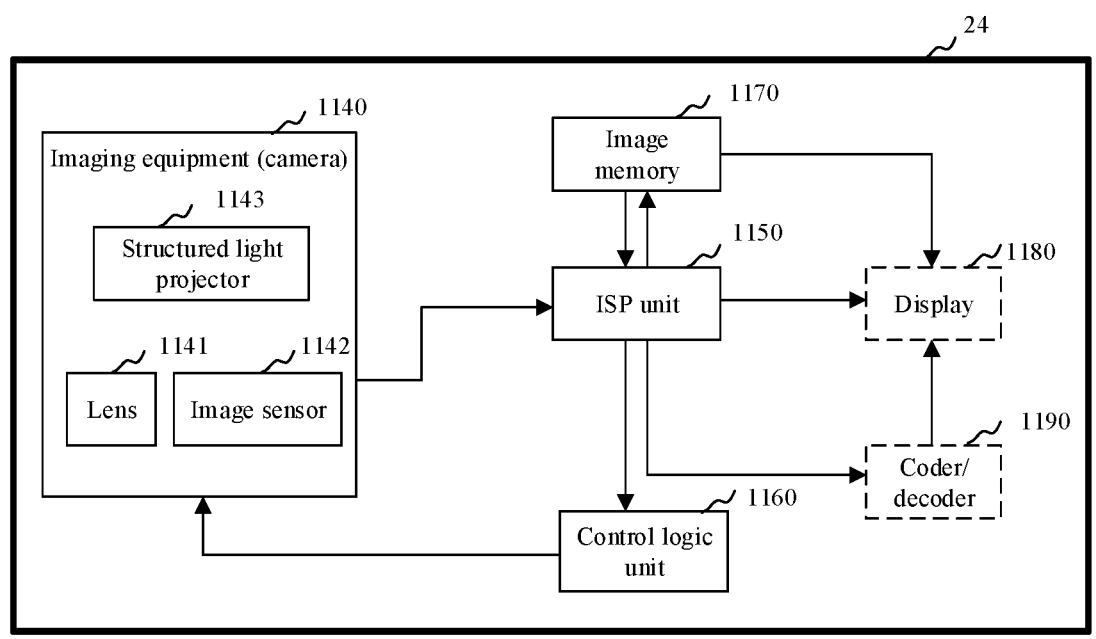
FIG. 6 is a structure diagram of an image processing circuit according to an embodiment of the present application.

FIG. 6 is a schematic diagram of an image processing circuit according to an embodiment of the disclosure. As shown in FIG. 6, each aspect of an image processing technology related to the embodiments of the present application is shown only for convenient description.

As shown in FIG. 6, the image processing circuit 24 includes imaging equipment 1140, an ISP unit 1150 and a control logic unit 1160. The imaging equipment 1140 may include a camera with one or more lenses 1141 and an image sensor 1142 and a structured light projector 1143. The structured light projector 1143 projects structured light to a detected subject. A pattern of the structured light may be a laser fringe, a gray code, a sine fringe, a randomly arranged speckle pattern or the like. The image sensor 1142 captures a structured light image formed by projection onto the detected subject and sends the structured light image to the ISP unit 1150, and then the ISP unit 1150 demodulates the structured light image to acquire depth information of the detected subject. Meanwhile, the image sensor 1142 may also capture color information of the detected subject. Of course, the structured light image and color information of the detected subject may also be captured by two image sensors 1142 respectively.

For example, for a speckle structured light, the ISP unit 1150 demodulates the structured light image, specifically including that: a speckle image of the detected subject is acquired from the structured light image, image data calculation is performed on the speckle image of the detected subject and a reference speckle image according to a predetermined algorithm, and a movement distance of each speckle point of the speckle image on the detected subject relative to a reference speckle point in the reference speckle image is acquired; and a depth value of each speckle point of the speckle image is calculated by use of triangulation conversion, and the depth information of the detected subject is obtained according to the depth value.

Of course, the depth image information and the like may also be acquired by use of a binocular vision method or a Time Of Flight (TOF)-based method. There are no limits made herein. Any method by which the depth information of the detected subject may be acquired or calculated shall fall within the scope of the implementation mode.

The ISP unit 1150, after receiving the color information, captured by the image sensor 1142, of the detected subject, may process image data corresponding to the color information of the detected subject. The ISP unit 1150 analyzes the image data to acquire image statistical information configurable to determine one or more control parameters of the ISP unit and/or the imaging equipment 1140. The image sensor 1142 may include a color filter array (for example, a Bayer filter), and the image sensor 1142 may acquire light intensity and wavelength information captured by each imaging pixel of the image sensor 1142 and provide a set of original image data processible for the ISP unit 1150.

The ISP unit 1150 processes the original image data pixel by pixel according to multiple formats. For example, each image pixel may have a bit depth of 8, 10, 12 or 14 bits. The ISP unit 1150 may execute one or more image processing operations on the original image data and collect the image statistical information about the image data, wherein the image processing operations may be executed according to the same or different bit depth accuracy.

The ISP unit 1150 may further receive the pixel data from an image memory 1170. The image memory 1170 may be a part of a memory device, storage equipment or an independent dedicated memory in electronic equipment, and may include a Direct Memory Access (DMA) feature.

When receiving the original image data, the ISP unit 1150 may execute the one or more image processing operations.

The ISP unit 1150, after acquiring the color information and depth information of the detected subject, may integrate them to obtain a three-dimensional image. Wherein, corresponding features of the detected subject may be extracted by use of at least one of an exterior contour extraction method or a contour feature extraction method. For example, the features of the detected subject are extracted by use of a method of Active Shape Model (ASM), Active Appearance Model (AAM), Principal Component Analysis (PCA), Discrete Cosine Transform (DCT) and the like, which will not be limited herein. Registration and feature integration processing is performed on the feature, extracted from the depth information, of the detected subject and the feature, extracted from the color information, of the detected subject respectively. Integration processing mentioned herein may refer to directly combining the features extracted from the depth information and the color information and may also refer to performing weight setting on the same feature in different images for combination, and another integration manner may also be adopted. The three-dimensional image is finally generated according to the integrated features.

The image data of the three-dimensional image may be sent to the image memory 1170 for other processing before displaying. The ISP unit 1150 receives the processed data from the image memory 1170 and performs image data processing in an original domain and color spaces Red, Green and Blue (RGB) and YCbCr on the processed data. The image data of the three-dimensional image may be output to a display 1180 for a user to view and/or for further processing by a Graphics Processing Unit (GPU). In addition, output of the ISP unit 1150 may further be sent to the image memory 1170, and the display 1180 may read the image data from the image memory 1170. In an embodiment, the image memory 1170 may be configured to implement one or more frame buffers. Moreover, the output of the ISP unit 1150 may be sent to a coder/decoder 1190 to code/decode the image data. The coded image data may be stored, and is decompressed before being displayed on the display 1180. The coder/decoder 1190 may be implemented by a Central Processing Unit (CPU) or a GPU or a coprocessor.

The image statistical information determined by the ISP unit 1150 may be sent to the control logic unit 1160. The control logic unit 1160 may include a processor and/microcontroller executing one or more routines (for example, firmware), and the one or more routines may determine the control parameter of the imaging equipment 1140 according to the received image statistical data.

According to the terminal equipment provided in the embodiment, portrait recognition is performed on the first preview picture to determine the first portrait in the first preview picture, then the target region to be protected is determined according to the determined information of the first portrait, and during preview picture switching, blurring is performed on the region other than the target region in the second preview picture. Therefore, when blurring is performed on the preview picture, preview picture blurring time is saved. Moreover, a shot subject is prevented from being mistakenly blurred in case of shaking, so that a blurring effect of the preview picture is improved, and a satisfaction degree of a user is improved.

The present application further provides a computer-readable storage medium.

A computer program is stored in the computer-readable storage medium, and the computer program is executed by a processor to implement the method for blurring the preview picture according to the first aspect of the embodiments. The method for blurring the preview picture includes that portrait recognition is performed on a first preview picture to determine first portrait information in the first preview picture, wherein the information of the first portrait includes an area of a first portrait; a target region to be protected is determined according to the information of the first portrait; and during preview picture switching, blurring is performed on a region other than the target region in a second preview picture.

In the present application, unless otherwise definitely specified and limited, the terms "set", "connect" or the like should be broadly understood. For example, it may refer to mechanical connection and may also refer to electrical connection; it may refer to direct connection and may also refer to indirect connection implemented through a medium; and it may further refer to internal communication of two components or an interaction relationship between the two components, unless otherwise definitely limited. For those of ordinary skill in the art, specific meanings of these terms in the disclosure can be understood according to a specific condition.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure.

In addition, terms "first" and "second" are only adopted for description and should not be understood to indicate or imply relative importance or implicitly indicate the number of indicated technical features. Therefore, a feature defined by "first" or "second" may explicitly or implicitly indicate inclusion of at least one such a feature.

Any process or method in the flowcharts or described herein in another manner may be understood to represent a module, segment or part including codes of one or more executable instructions configured to realize specific logic functions or operations of the process and, moreover, the scope of the preferred implementation mode of the disclosure includes other implementation, not in a sequence shown or discussed herein, including execution of the functions basically simultaneously or in an opposite sequence according to the involved functions. This should be understood by those skilled in the art of the embodiments of the disclosure.

It should be understood that each part of the disclosure may be implemented by hardware, software, firmware or a combination thereof. In the abovementioned implementation modes, multiple operations or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the operations in the method of the abovementioned embodiment may be completed through related hardware instructed by a program, the program may be stored in a computer-readable storage medium, and when the program is executed, one or combination of the operations of the method embodiment is included.

The storage medium may be a read-only memory, a magnetic disk, an optical disk or the like. The embodiments of the disclosure have been shown or described above. However, it can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A method for blurring a preview picture, comprising:
performing portrait recognition on a first preview picture to determine information of a first portrait in the first preview picture, the information of the first portrait comprising an area of the first portrait;
determining a target region to be protected according to the information of the first portrait; and
in switching preview pictures, blurring a region other than the target region in a second preview picture;
wherein determining the target region to be protected according to the information of the first portrait comprises:
acquiring a library of portrait templates, the library of portrait templates comprising correspondences among attributes of a portrait and portrait templates and maximum areas of the portrait;
determining the attribute of the first portrait according to:
a matching degree of the information of the first portrait and each of preset portrait templates in a library of portrait templates; and
the correspondence between the attribute of the portrait and the portrait template in the library of portrait templates; and
determining an area of the target region according to the attribute of the first portrait and the correspondence between the attribute of the portrait and the maximum area of the portrait in the library of portrait templates.

2. The method according to claim 1, wherein acquiring the library of portrait templates comprises:
acquiring a sample set of portrait images, the sample set comprising various pictures of pose and orientation of portraits; and
training the sample set of portrait images to determine portrait templates and maximum areas of portraits corresponding to users with different attributes.

3. The method according to claim 1, wherein acquiring the library of portrait templates comprises:
acquiring an initial library of portrait templates, the initial library of portrait templates comprising the portrait templates and the maximum areas of portraits corresponding to the users with different attributes; and
updating the initial library of portrait templates according to portrait images acquired within a preset time.

4. The method according to claim 1, before blurring the region other than the target region in the second preview picture, further comprising:
acquiring an instruction for protecting a portrait edge;
or, determining that a shaking amplitude of a shooting terminal is higher than a first threshold value.

5. The method according to claim 1, wherein blurring the region other than the target region in the second preview picture comprises:
blurring the region to different extents according to a distance between the region and the target region.

6. The method according to claim 1, wherein performing portrait recognition on the first preview picture comprises:
determining depth information corresponding to a face region in the first preview picture;
determining a portrait contour in the first preview picture according to the depth information;
determining whether a depth change value corresponding to the portrait contour is greater than a threshold value or not; and
responsive to the determination that the depth change value corresponding to the portrait contour is greater than the threshold value, correcting the portrait contour according to color information of each pixel and adjacent pixel thereof in the portrait contour.

7. An apparatus for blurring a preview picture, comprising a processor and a memory, wherein the memory is configured to store instructions, when executed by the processor, causing the processor to implement the operations of:
performing portrait recognition on a first preview picture to determine information of a first portrait in the first preview picture, the information of the first portrait comprising an area of the first portrait;
determining a target region to be protected according to the information of the first portrait; and
in switching preview pictures, blurring a region other than the target region in a second preview picture;
wherein the operation of determining the target region to be protected according to the information of the first portrait comprises:
acquiring a library of portrait templates, the library of portrait templates comprising correspondences among attributes of a portrait and portrait templates and maximum areas of the portrait;
determining the attribute of the first portrait according to:
a matching degree of the information of the first portrait and each of preset portrait templates in a library of portrait templates; and
the correspondence between the attribute of the portrait and the portrait template in the library of portrait templates; and
determining an area of the target region according to the attribute of the first portrait and the correspondence between the attribute of the portrait and the maximum area of the portrait in the library of portrait templates.

8. The apparatus according to claim 7, wherein the operation of acquiring the library of portrait templates comprises:
acquiring a sample set of portrait images, the sample set comprising various pictures of pose and orientation of portraits; and
training the sample set of portrait images to determine portrait templates and maximum areas of portraits corresponding to users with different attributes.

9. The apparatus according to claim 7, wherein the operation of acquiring the library of portrait templates comprises:
acquiring an initial library of portrait templates, the initial library of portrait templates comprising the portrait templates and the maximum areas of portraits corresponding to the users with different attributes; and
updating the initial library of portrait templates according to portrait images acquired within a preset time.

10. The apparatus according to claim 7, before the operation of blurring the region other than the target region in the second preview picture, wherein the operations further comprises:
acquiring an instruction for protecting a portrait edge inputted in a manual press manner, in a voice input manner or in a manual sliding manner;
or, determining that a shaking amplitude of a shooting terminal is higher than a first threshold value.

11. The apparatus according to claim 7, wherein the operation of blurring the region other than the target region in the second preview picture comprises:
blurring the region to different extents according to a distance between the region and the target region.

12. The apparatus according to claim 7, wherein the operation of performing portrait recognition on the first preview picture comprises:
determining depth information corresponding to a face region in the first preview picture by scanning via an ultrasonic radar or according to a triangulation ranging principle;
determining a portrait contour in the first preview picture according to the depth information;
determining whether a depth change value corresponding to the portrait contour is greater than a threshold value or not; and
responsive to the determination that the depth change value corresponding to the portrait contour is not greater than the threshold value, correcting the portrait contour according to color information of each pixel and adjacent pixel thereof in the portrait contour.

13. The apparatus according to claim 7, wherein the processor is configured to execute the instructions to determine the first portrait according to a pre-shot image.

14. A non-transitory computer-readable storage medium having stored herein executable instructions by a processor, wherein the executable instructions, when being executed, are configured to:
perform portrait recognition on a first preview picture to determine information of a first portrait in the first preview picture, the information of the first portrait comprising an area of the first portrait;
determine a target region to be protected according to the information of the first portrait; and blur a region other than the target region in a second preview picture in switching preview pictures;

wherein the operation of determining the target region to be protected according to the information of the first portrait comprises:

acquiring a library of portrait templates, the library of portrait templates comprising correspondences among attributes of a portrait and portrait templates and maximum areas of the portrait;

determining the attribute of the first portrait according to:
- a matching degree of the information of the first portrait and each of preset portrait templates in a library of portrait templates; and
- the correspondence between the attribute of the portrait and the portrait template in the library of portrait templates; and determining an area of the target region according to the attribute of the first portrait and the correspondence between the attribute of the portrait and the maximum area of the portrait in the library of portrait templates.

* * * * *

UNITED STATES PATENT AND TRADEMARK OFFICE
CERTIFICATE OF CORRECTION

Page 1 of 1

PATENT NO. : 10,674,069 B2
APPLICATION NO. : 16/150411
DATED : June 2, 2020
INVENTOR(S) : Guohui Tan et al.

It is certified that error appears in the above-identified patent and that said Letters Patent is hereby corrected as shown below:

On the Title Page

Item (73) Assignee:
"GUANGDONG OPPO MOBILE TELECOMMUNICATIONS CORP. LTD., Dongguan (CN)"
Is changed to:
--GUANGDONG OPPO MOBILE TELECOMMUNICATIONS CORP., LTD., Dongguan, Guangdong (CN)--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*